(12) United States Patent
Yamada et al.

(10) Patent No.: US 6,923,053 B2
(45) Date of Patent: Aug. 2, 2005

(54) GAS FLOWMETER AND MANUFACTURING METHOD THEREOF

(75) Inventors: Masamichi Yamada, Hitachinaka (JP); Junichi Horie, Hitachinaka (JP); Izumi Watanabe, Hitachinaka (JP); Keiichi Nakada, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/954,270

(22) Filed: Oct. 1, 2004

(65) Prior Publication Data

US 2005/0050953 A1 Mar. 10, 2005

Related U.S. Application Data

(63) Continuation of application No. 10/245,274, filed on Sep. 18, 2002, now abandoned.

(30) Foreign Application Priority Data

Mar. 27, 2002 (JP) .............................. 2002-87727

(51) Int. Cl.[7] .............................................. G01F 1/68

(52) U.S. Cl. ................................................. 73/204.26
(58) Field of Search ...................... 73/204.26, 204.23, 73/204.25

(56) References Cited

U.S. PATENT DOCUMENTS

| 5,393,351 | A  | * | 2/1995 | Kinard et al. ............... 136/225 |
| 6,523,403 | B1 | * | 2/2003 | Fuertsch et al. .......... 73/204.26 |
| 6,557,411 | B1 | * | 5/2003 | Yamada et al. .......... 73/204.26 |

FOREIGN PATENT DOCUMENTS

JP 2001-194202 7/2001

* cited by examiner

*Primary Examiner*—Harshad Patel
(74) *Attorney, Agent, or Firm*—Crowell & Moring LLP

(57) ABSTRACT

A gas flowmeter capable of reducing a secular change comprises a silicon semiconductor substrate formed with a cavity and a heat element formed above the cavity of the semiconductor substrate by way of an insulating film. The heat element is a silicon (Si) semiconductor thin film impurity-doped at high concentration. Stoichiometrically stable silicon nitride ($Si_3N_4$) thin films as barrier layers which less permeate and less absorb hydrogen in the heat generating temperature range of the heat element are formed above and below the silicon (Si) semiconductor thin film.

7 Claims, 8 Drawing Sheets

GAS FLOWMETER AND MANUFACTURING METHOD THEREOF

BACKGROUND OF THE INVENTION

The present invention relates to a gas flowmeter and a manufacturing method thereof and, more particularly, it relates to a thermal gas flowmeter in which a heat-generating resistor or heat element is made up of a silicon (Si) semiconductor thin film, as well as a manufacturing method thereof.

Heretofore, thermal gas flowmeters have been predominant as flowmeters for an amount of intake air provided in an electronic control fuel injection system of an internal combustion engine such as for automobiles, or a flowmeter for various kinds of gases used for the production of semiconductors and for hydrogen/oxygen for use in fuel cells since the thermal gas flowmeter can detect the amount of the mass gas directly. Among them, a gas flowmeter manufactured by semiconductor micro-machining technique has been noted since it can reduce the cost and can be driven at a low power.

As the gas flowmeters using existent semiconductor substrates, those using polycrystalline silicon (polysilicon) instead of platinum used so far have been known in view of the heat resistance and the material cost as the heat element as describe, for example, in Japanese Patent No. 2880651.

However, where polycrystalline silicon (polysilicon) is used as the heat element as described in this patent No. 2880651, there has recently been found a problem of secular change in which the resistance value of the heat element changes with lapse of time.

SUMMARY OF THE INVENTION

In view of the foregoing, it is an object of the present invention to provide a gas flowmeter capable of reducing the secular change, as well as a manufacturing method thereof.

(1) In order to attain the foregoing object, this invention provides a gas flowmeter comprising a semiconductor substrate formed with a cavity and at least a heat element formed by way of an insulating film above the cavity of the semiconductor substrate to measure the flow rate of a gas to be measured, in which the heat element is a silicon (Si) semiconductor thin film applied with impurity doping at high concentration, and the gas flow meter has barrier layers that disposed as an upper layer and a lower layer of the silicon (Si) semiconductor thin film and that ate formed in a region to cover at least the cavity, the barrier layers less permeating and absorbing hydrogen in a heat generating temperature range of the heat element.

With this constitution, the secular change of the resistance value of the heat element can be reduced by using the barrier layers and the secular change of the gas flowmeter can be reduced.

(2) In the above gas flowmeter (1), the barrier layer may comprise a stoichiometrically stable silicon nitride ($Si_3N_4$) thin film.

(3) In the above gas flowmeter (1), preferably, the silicon (Si) semiconductor thin film is a polycrystalline silicon (Si) semiconductor thin film applied with impurity-doping, and the polycrystalline silicon (Si) semiconductor thin film is doped with phosphorus (P) or boron (B) as impurities at a high concentration.

(4) In the above gas flowmeter (1), preferably, the doping is applied at such high concentration that the resistivity of the silicon (Si) semiconductor thin film is $8 \times 10^{-4}$ Ωcm or less.

(5) In order to attain the foregoing object, this invention provides a gas flowmeter comprising a semiconductor substrate formed with a cavity and at least a heat element formed by way of an insulating film above the cavity of the semiconductor substrate to measure the flow rate of a gas to be measured in which the silicon (Si) semiconductor thin film is a polycrystalline applied with impurity doping, the polycrystalline silicon (Si) thin film is applied with doping of phosphorus (P) or boron (B) as impurities at high concentration, and the gas flowmeter has barrier layers that disposed as an upper layer and a lower layer of the silicon (Si) semiconductor thin film and that are formed in a region to cover at least the cavity, the barrier layers less permeating and absorbing hydrogen in a heat generating temperature range of the heat element.

With this constitution, the secular change of the resistance value of the heat element can be reduced by using the barrier layers and the secular change of the gas flowmeter can be reduced.

(6) In the above gas flowmeter (5), the doping treatment is applied at high concentration such that the resistivity of the silicon (Si) semiconductor thin film is $8 \times 10^{-4}$ cm or less.

(7) The foregoing object can be attained according to this invention in a method of manufacturing a gas flowmeter comprising a semiconductor substrate formed with a cavity and at least a heat element formed by way of an insulating film above the cavity of the semiconductor substrate to measure the flow rate of a gas to be measured, in which the semiconductor substrate is a silicon semiconductor substrate, and the method includes the steps of: forming a first insulating film containing a stoichiometrically stable silicon nitride ($Si_3N_4$) thin film formed on the surface of the silicon semiconductor substrate, as at least a first barrier layer which less permeates and absorbs hydrogen; forming a silicon semiconductor thin film on the first insulating film; applying impurity doping by thermal diffusion to the silicon semiconductor thin film thereby doping impurities at high concentration; patterning the silicon semiconductor thin film and, forming at least a pattern of the heat element; stacking a second insulating film containing a stoichiometrically stable silicon nitride ($Si_3N_4$) thin film on the heat element as at least a second barrier layer which less permeates and absorbs hydrogen, and surrounding the heat element by the first and the second barrier layer; applying a heat treatment annealing to the heat element in a gas atmosphere at least containing hydrogen or in an inert gas atmosphere; forming an electrode film after forming through holes in the second insulating film so as to establish electrical connection between the heat element and an external circuit; and forming a cavity at the rear face of the silicon substrate.

With the method described above, the secular change of the resistance value of the heat element can be reduced by using the barrier layer and the secular change of the gas flowmeter can be reduced.

(8) In the above method (7), preferably, the heat treatment annealing is a heat treatment at 550° C. or higher and 900° C. or lower.

(9) In the above method (7), preferably, the heat treatment annealing is applied in an atmosphere at least containing a hydrogen gas in a case where hydrogen is contained in the gas to be measured.

(10) In the above method (7), preferably, the heat treatment annealing is applied in an atmosphere containing an inert gas in a case where hydrogen is not contained in the gas to be measured.

(11) The foregoing object can be attained by a method of manufacturing a gas flowmeter, according to the present invention, which comprises a semiconductor substrate formed with a cavity and at least a heat element formed by way of an insulating film above the cavity of the semiconductor substrate to measuring the flow rate of a gas to be measured. In the gas flowmeter, the semiconductor substrate is a silicon semiconductor substrate. The method includes the steps of: stacking a first silicon dioxide film, a stoichiometrically stable silicon nitride ($Si_3N_4$) thin film as a first barrier layer which less permeates and absorbs hydrogen, and a second silicon dioxide film on the surface of the silicon semiconductor substrate; forming a silicon semiconductor thin film on the second silicon dioxide film; applying an impurity doping by thermal diffusion to the silicon semiconductor thin film to apply doping of phosphorus (P) at high concentration such that the resistivity is $8 \times 10^{-4}$ $\Omega$cm or less; patterning the silicon semiconductor thin film to form at least a pattern for the heat element; stacking a third silicon dioxide film, a stoichiometrically stable silicon nitride ($Si_3N_4$) thin film as a second barrier layer which less permeates and absorbs hydrogen and a fourth silicon dioxide film further on the heat element, and surrounding the heat element with the first and the second barrier layer which less permeate hydrogen; applying a heat treatment annealing to the heat element in a gas atmosphere at least containing hydrogen or in an inert gas atmosphere at a temperature of 550° C. or higher and 900° C. or lower; forming an electrode film after forming through holes in the second silicon dioxide film, the second barrier layer and the fourth silicon dioxide film so as to establish electrical connection between the heat element and an external circuit; and forming a cavity in the rear face of the silicon substrate.

With the method described above, the secular change of the resistance value of the heat element can be reduced by using the barrier layer and the secular change of the gas flowmeter can be reduced.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

The constitution of a gas flowmeter according to a first embodiment of this invention will be described below with reference to FIGS. 1 to 13.

Figure 1:
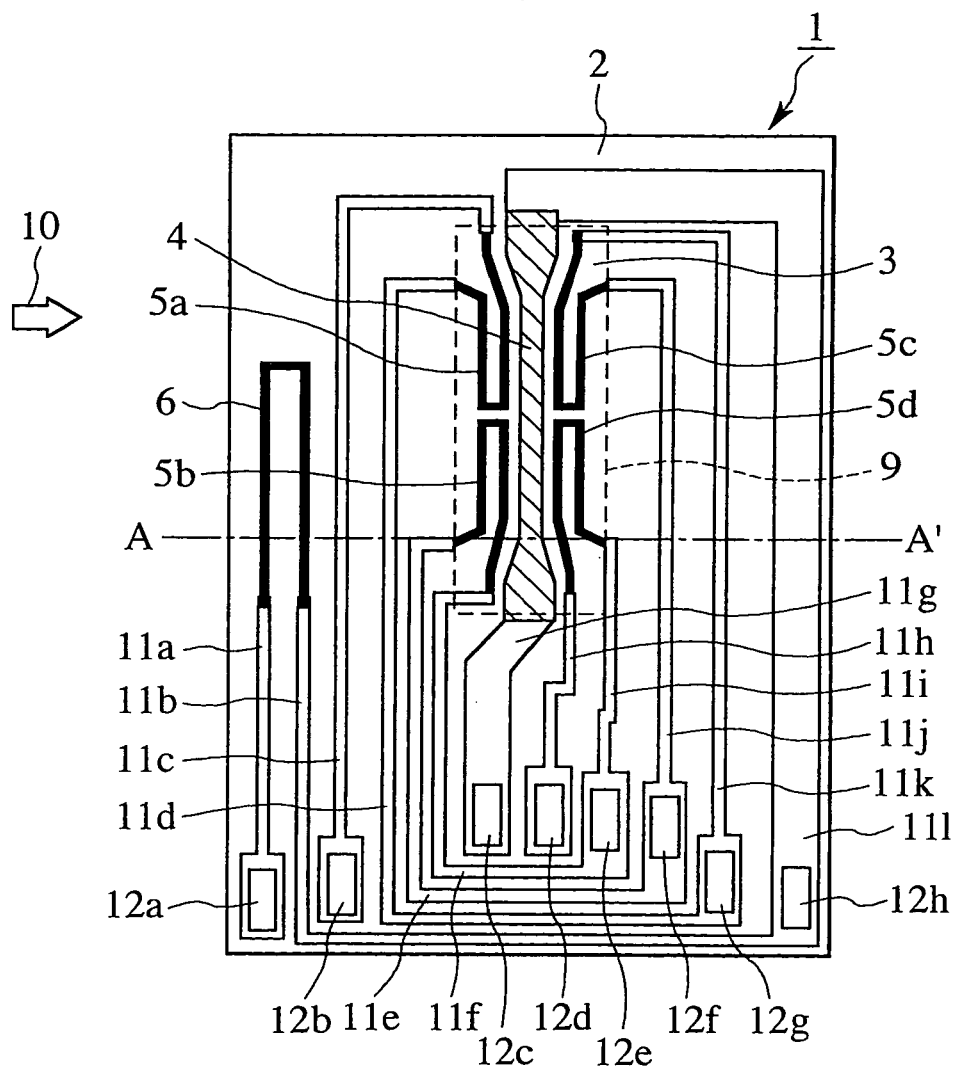
FIG. 1 is a plan view of a sensor device of a gas flowmeter according to a first embodiment of the invention.
Figure 2:
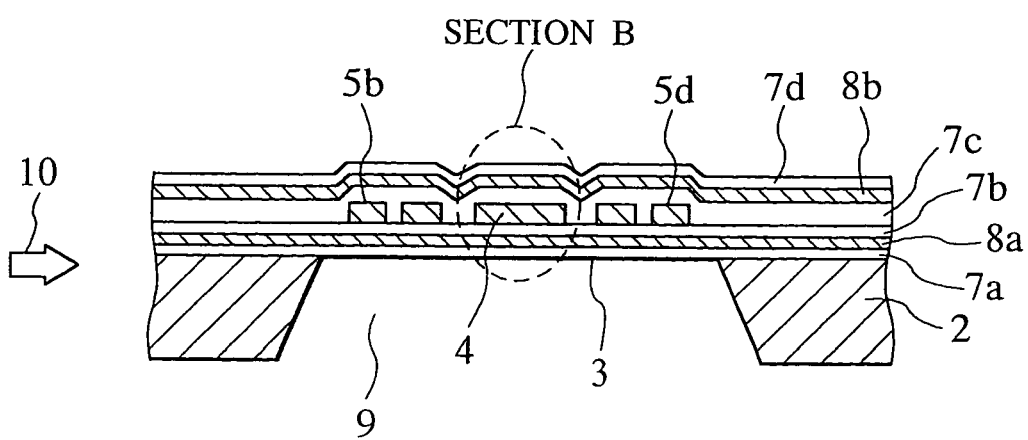
FIG. 2 is a cross sectional view taken along line A–A' in FIG. 1.

FIG. 1 is a plan view of a sensor device of the gas flowmeter according to the first embodiment of this invention. FIG. 2 is a cross sectional view taken along line A–A' in FIG. 1.

A sensor device 1 is formed entirely on a semiconductor substrate 2 as a base. The semiconductor substrate 2 is a single crystal silicon (Si) plate. As shown in FIG. 2, a cavity 9 is formed on the side of the lower surface of the semiconductor substrate 2, and a diaphragm 3 is formed on the cavity 9. As shown by a dotted line in FIG. 1, the cavity 9 is formed as a hole having a substantially rectangular planer shape.

As shown in FIG. 2, three-layered films comprising an insulating film 7a, a barrier layer 8a and an insulating film 7b are stacked successively on one surface of the semiconductor substrate 2. The three-layered films have a structure of covering the entire surface of the semiconductor substrate 2 including the cavity 9. The insulating films 7a and 7b comprise silicon dioxide ($SiO_2$). The barrier layer 8a is formed of a stoichiometrically stable silicon nitride ($Si_3N_4$) thin film that less permeates and absorbs hydrogen within a heat generation temperature range of a heat-generating resistor or heat element 4. The heat element 4, and upstream-temperature measuring resistors 5a and 5b and downstream-temperature measuring resistors 5c and 5d are formed on the surface of the insulating film 7b constituting the diaphragm 3. Further, a gas temperature measuring resistor 6 is formed on the surface of the insulating film 7b in a region outside the diaphragm 3.

As shown in FIG. 1, the heat element 4, the gas temperature measuring resistor 6, the temperature measuring resistors 5a to 5d, the gas temperature measuring resistor 6 and wiring connection portions 11 (11a, 11b, 11c, 11d, 11e, 11f, 11g, 11h, 11i, 11j, 11k, and 11l) for each of the resistors are prepared each as fine stripe having predetermined conductivity (resistance value) from a polycrystalline or single crystalline silicon semiconductor thin film subjected to a phosphorus (P) or boron doping treatment at high concentration.

Three-layered films of an insulating film 7c, a barrier layer 8b and insulating film 7d are successively stacked on the upper layer of the insulating film 7b and each of the resistors. The three-layered films have a structure of covering the entire surface of the semiconductor substrate 2 including the cavity 9. The insulating film 7a and 7b comprise silicon dioxide ($SiO_2$). The barrier layer 8a is formed of a stoichiometrically stable silicon nitride ($Si_3N_4$) thin film which less permeates and absorbs hydrogen within a heat generation temperature range of the heat element 4. The three-layered films of the insulating film 7c, the barrier 8b and the insulating film 7d are provided to protect each of the resistors.

As described above, the upper layer and the lower layer for each of the resistors are constituted, respectively, so as to be surrounded by the barrier layers 8a and 8b which less permeates and absorbs hydrogen in the heat generation temperature region of the heat element 4.

The thin silicon semiconductor film as each of the resistors is subjected to a heat treatment annealing at 550° C. or higher and 900° C. or lower in order to reduce the secular change of the resistance upon current supply at high temperature.

In terminal electrodes 12 (12a, 12b, 12c, 12d, 12e, 12f, 12g and 12h), through holes (not shown) are formed in the three-layered films of the insulating film 7c, the barrier layer 8b and the insulating film 7d and then thin film pads (electrode films) such as of aluminum (Al) or gold (Au) are formed to establish electric connection with each of the resistors.

The heat element 4 is disposed substantially linearly along a direction perpendicular to the flowing direction of a gas to be measured depicted by an arrow 10, the temperature measuring resistors 5a, 5b, 5c and 5d are formed so as to be paired with each other while being spaced apart in the directions of the upstream and the downstream, and the direction perpendicular to the flowing direction of the gas. The targeted gas to be measured includes air, hydrogen, nitrogen, oxygen, gaseous carbon dioxide, city gas, methane, propane, butane and steams.

In the gas flowmeter of this embodiment having the constitution as described above, since the diaphragm 3 comprising the insulating films 7a, 7b, 7c and 7d and the barrier layers 8a, 8b has a structure covering the entire surface of the cavity 9, the mechanical strength of the diaphragm 3 can be kept, dusts, oil and water do not intrude into the cavity in the inside and measurement at high reliability is possible for a long period of time.

A measuring operation by the gas flowmeter according to this embodiment will then be explained.

At first, electric current is supplied to the heat element 4 on the diaphragm 3 in a thermally insulated state by the cavity 9, and controlled such that the temperature is higher by a certain level than the temperature of a gas flow 10. The temperature of the gas to be measured is measured, as described later, based on the resistance value of the gas temperature-measuring resistor.

The gas flow rate and the gas flowing direction are measured by comparing the temperatures (resistance values) of upstream-temperature measuring resistors 5a and 5b disposed upstream the heat element 4 with the temperatures of the downstream-temperature measuring resistors 5c and 5d disposed downstream the heat element 4.

At first, since the upstream-temperature measuring resistors 5a and 5b and the downstream-temperature measuring resistors 5c and 5d are under the same heating condition due to the heat generation of the heat element 4 when the gas flow rate is zero, they show an identical temperature not causing temperature difference.

Then, when the gas flows in the direction of the arrow 10 (referred to as "forward stream"), since the upstream-temperature measuring resistors 5a and 5b are greater in the cooling effect caused by the gas flow 10 than the downstream-temperature measuring resistors 5c and 5d, a difference between the temperatures of the upstream-temperature measuring resistors 5a and 5b and the downstream-temperature measuring resistors 5c and 5d is caused, and the gas flow rate is measured based on this temperature difference.

On the other hand, when the gas flows in the direction opposite to the arrow 10 (referred to as "backward flow"), the temperature of the downstream-temperature measuring resistors 5c and 5d is lower than the temperature of the upstream-temperature measuring resistors 5a and 5b, in which the sign representing the temperature difference between the upstream-temperature measuring resistors 5a and 5b and the downstream-temperature measuring resistors 5c and 5d is inverted.

As described above, the gas flow rate can be measured based on the temperature difference, and the direction of the gas flow can be judged by the sign of the temperature difference.

A description will then be made of the constitution of an air flowmeter for use in an internal combustion engine using the gas flowmeter according to the first embodiment of this invention.

Figure 3:
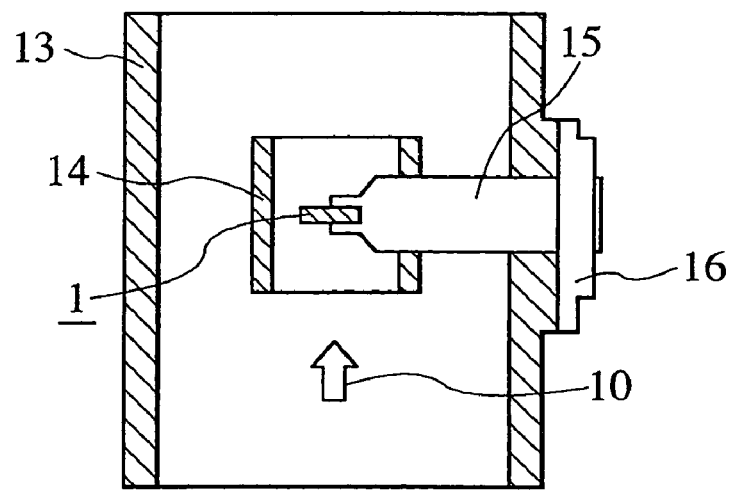
FIG. 3 is a cross sectional view showing the state of mounting an air flowmeter for use in an internal combustion engine using the gas flowmeter according to the first embodiment of this invention.

FIG. 3 is a cross sectional view showing the state of mounting the air flowmeter for use in the internal combustion engine using the gas flowmeter according to the first embodiment of the invention.

As shown in FIG. 3, the sensor device 1 shown in FIG. 1 is mounted, for example, to an air intake passage 13 of an automobile internal combustion engine. The sensor device 1, including a support 15 and an external circuit 16 therefor, is disposed 16 in a sub-passage 14 provided inside the air intake passage 13. The external circuit 16 is electrically connected by way of the support 15 to the terminal electrodes (terminal electrodes 12 shown in FIG. 1) of the sensor-measuring device 1.

The intake air of the internal combustion engine usually flows in the direction depicted by an arrow 10 (forward flow). Further, depending on the operation conditions of the internal combustion engine, it may sometimes flow in the direction opposite to the arrow 10 (backward flow). As described above, the air flow flowing the air intake passage of the internal combustion engine includes the forward flow and the backward flow, and the air flow rate can be measured exactly either in the case of the forward flow and the backward flow and a distinguishment between them can be made by the use of the gas flowmeter in this embodiment.

Also in the case of measuring the flow rates of various gases used for semiconductor production and hydrogen/oxygen used in fuel cells, the gas flow rate is measured by disposing the sensor device 1 in the gas passage as with the constitution shown in FIG. 3. In particular, in a case where the air flow rates of combustible gases such as hydrogen, oxygen, city gas, methane, propane and butane are measured, a circuit portion such as the external circuit 16 is constituted in such a way as to sufficiently keep air tightness so as to inhibit leakage of the combustible gas thereto in order that safety is protected.

Figure 4:
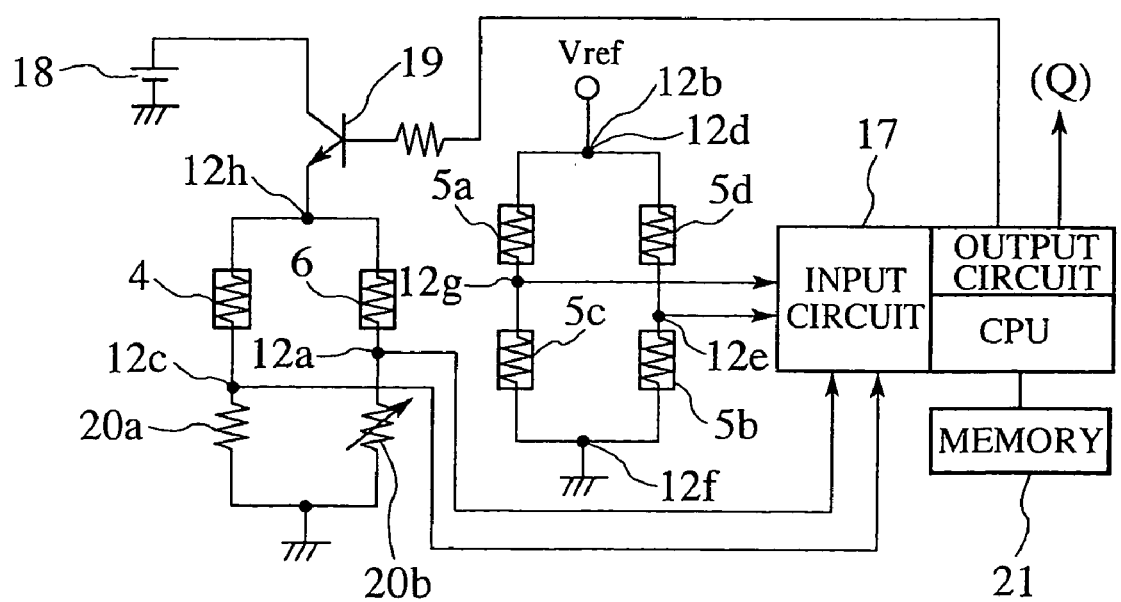
FIG. 4 is a circuit diagram of the gas flowmeter according to the first embodiment of this invention.

Then, the circuit constitution of the gas flowmeter according to the first embodiment of this invention will be explained with reference to FIG. 4, which is a circuit diagram of the gas flowmeter. In the figure, identical reference numerals with those in FIG. 1 represent identical portions.

The heat element 4 and the gas temperature-measuring resistor 6 constitute a bridge circuit together with resistors 20a and 20b. Power is supplied to the bridge circuit from a power source 18 by way of a transistor 19. The voltage at the terminals 12a and 12c of the bridge circuit are inputted to a control circuit 17. The control circuit 17 comprises an input circuit including an A/D converter or the like, an output circuit including a D/A converter or the like and CPU for conducting operational processing. In the bridge circuit, the resistance value of each of the resistors 20a and 20b is set such that the temperature (Th) of the heat element 4 is higher by a predetermined value than the temperature (Ta) of the gas temperature measuring resistor 6 corresponding to the gas temperature ($\Delta$Th=Th−Ta=150° C.)

The control circuit 17 controls the transistor 19 such that the temperature (Th) of the heat element 4 is higher by a predetermined value ($\Delta$Th) than the temperature (Ta) of the gas temperature-measuring resistor 6 corresponding to the gas temperature. That is, when the temperature of the heat element 4 is lower than the set value, the transistor 19 is turned on by the output from the control circuit 17 to allow a heating current to flow the heat element 4. On the contrary, when the temperature is higher than the set temperature, the transistor 19 is turned off to decrease the heating current for the heat element 4 to zero, whereby the temperature is controlled so as to keep the set temperature value.

Further, the upstream-temperature measuring resistors 5a and 5b and the downstream-temperature measuring resistors 5c and 5c constitute a bridge circuit. The potential difference at the terminals 12g and 12e of the bridge circuit is inputted to the control circuit 17. The control circuit 17 detects the temperature difference between the upstream-temperature measuring resistors 5a and 5b and the downstream-temperature measuring resistors 5c and 5d based on the potential difference between the terminals 12g and 12e of the bridge circuit. Prior to detection of the temperature difference, a resistance value of an adjusting resistor (not shown) is previously adjusted such that potentials between the terminals 12g and 12e of the bridge circuit agree with each other when the gas flow rate is zero. Alternatively, a potential difference between the terminals 12g and 12e when the gas flow rate is zero is previously stored in a memory 21.

In the measurement of the gas flow rate, the relation between the gas flow rate (Q) and the potential difference between the terminals 12g and 12e of the bridge circuit are previously stored as a map in the memory 21 and, the measured value of the gas flow rate (Q) and the flowing direction of the gas flow are judged and outputted based on the potential difference and the magnitude relation between the terminals 12g and 12e, respectively.

In this embodiment, the heat element 4 and the gas temperature measuring resistor 6 are formed of thin silicon semiconductor films at an identical impurity concentration such that the temperature coefficient of resistance (a) is equal between them based on the bridge circuit constitution shown in the drawing. Since the resistance values for each of the resistors 20a and 20b required for setting the temperature (Th) of the heat element 4 (for example, $\Delta$Th=150° C.) are in a simple proportional relation therewith, they can be set easily and simply.

Further, in this embodiment, the bridge circuit for detecting the temperature difference is constituted by using the four temperature measuring resistors 5a, 5b, 5c and 5d in a manner where the upstream-temperature measuring resistors 5a and 5b and the downstream-temperature measuring resistors 5c and 5d intersect each other and, accordingly, the potential difference appearing between the terminals 12g and 12e increase about twice a bridge circuit comprising a pair of temperature measuring resistors, so that the sensitivity is increased and the accuracy is improved.

For the method of detecting the gas flow rate (Q), it is also possible to adopt a method of using a heating current (corresponding to the potential at the terminal 12c in FIG. 4) flowing to the heating element 4 as the flow rate detection signal in addition to the method of detecting the temperature difference between the upstream-temperature measuring resistors 5a and 5b and the downstream-temperature measuring resistors 5c and 5d. Further, it is also possible to adopt a method of multiplying the signal for the temperature difference between the upstream-temperature measuring resistors 5a and 5b and the downstream-temperature measuring resistors 5c and 5d with a heating current (corresponding to the potential at the terminal 12c in FIG. 4) flowing to the heat element 4, thereby obtaining a flow rate detection signal.

Production steps for the sensor device of the gas flowmeter according to the first embodiment of this invention will then be described with reference to FIG. 5.

FIG. 5 is step diagrams showing manufacturing steps of the sensor device for the gas flowmeter according to the first embodiment of this invention. Identical reference numerals with those in FIG. 1 show identical portions.

Figure 5A:
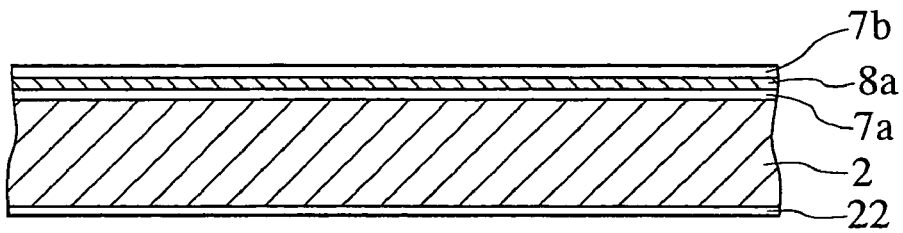
FIG. 5 is a step diagram showing manufacturing steps of a sensor device of the gas flowmeter according to the first embodiment of the invention.

As shown in FIG. 5A, silicon dioxide ($SiO_2$) layers 7a and 22 are formed on the upper and lower surfaces of the silicon semiconductor substrate 2, respectively, by a thermal oxidation treatment with each having a thickness of about 0.2 $\mu$m. Then, a stoichiometrically stable silicon nitride ($Si_3N_4$) thin film which less permeates and absorbs hydrogen in a heat generating temperature range of the heat element 4 (<550° C.) is formed to about 0.15 $\mu$m in thickness at a temperature of 770 to 800° C. by a vacuum CVD method (Chemical Vapor Deposition: hereinafter referred to as LPCVD method). The stoichiometrically stable silicon nitride ($Si_3N_4$) thin film has a dense film quality, which is a film of high mechanical strength having residual tensile stresses and also has a characteristic of less permeating and absorbing hydrogen within the heat generating temperature range (<550° C.) of the heat element 4.

Although of identical silicon nitride thin films, thin silicon nitride films formed by a plasma CVD method for forming films at a low deposition temperature in a plasma atmosphere (plasma silicon nitride thin film) or a sputtering method has a chemical structure of $Si_xN_y$ (x, y=indefinite) different from the stoichiometrically stable silicon oxide ($Si_3N_4$) thin film; therefore, it has coarse, unstable film quality, low mechanical strength, and a great amount of hydrogen contained, and hydrogen permeates easily, so that they are not suitable to the barrier layer of this embodiment.

Then, a silicon dioxide ($SiO_2$) layer 7b is formed to about 0.5 $\mu$m in thickness by an LPCVD method on the barrier layer 8a. The silicon dioxide ($SiO_2$) film formed by the LPCVD method has opposite compressive stresses in the film and heat conductivity smaller by one digit as compared with the silicon nitride ($Si_3N_4$) thin film described above.

Accordingly, since this provides a multi-layered structure of the silicon dioxide (SiO$_2$) layers 7a and 7b and the thin silicon nitride (Si$_3$N$_4$) film 8a, and the silicon nitride (Si$_3$N$_4$) thin film has tensile stresses in the film while the silicon dioxide (SiO$_2$) film has compressive stresses in the film, the residual stresses act in the direction offset with each other, so that distortion caused by the residual stresses in the diaphragm 3 can be reduced to improve the strength.

Figure 5B:
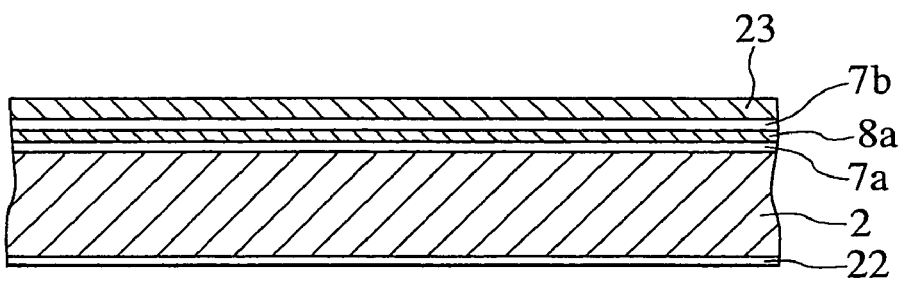

Then, as shown in FIG. 5B, a polycrystalline silicon (Si) semiconductor thin films 23 for forming the heat element 4 and the temperature measuring resistors 5a to 5d and 6 are formed on the insulating film 7b with each having a thickness of about 1 μm by the method such as the LPCVD. The polycrystalline silicon (Si) semiconductor thin film may also be formed by the LPCVD using plasmas, ECR-PCVD using electron cyclotron resonance or CVD using microwaves as other plasma using manufacturing methods. While the polycrystalline silicon (Si) semiconductor thin film is used for the silicon (Si) semiconductor thin film 23 in this embodiment, a silicon (Si) semiconductor thin film of an epitaxially grown single crystal structure may also be formed.

Then, an impurity doping treatment is applied to the thus formed silicon (Si) semiconductor thin film 23 by a thermal diffusion treatment. Phosphorus glass (POCl$_3$) is formed on the surface of silicon (Si) semiconductor thin film 23 and a heat treatment at 1000° C. for 30 min or more is applied to form a silicon (Si) semiconductor thin film 23 doped with phosphorus (P) at high concentration to provide a resistivity (ρ) of 8×10$^{-4}$ Ωcm or less.

While phosphorus (P) is used as the impurity in this step, high concentration doping can also be conducted by using boron (B) as the impurity. With regard to the stability of the resistance value (secular change) of the thus formed silicon (Si) semiconductor film, the use of phosphorus (P) as the impurity can provide more effect.

Figure 5C:
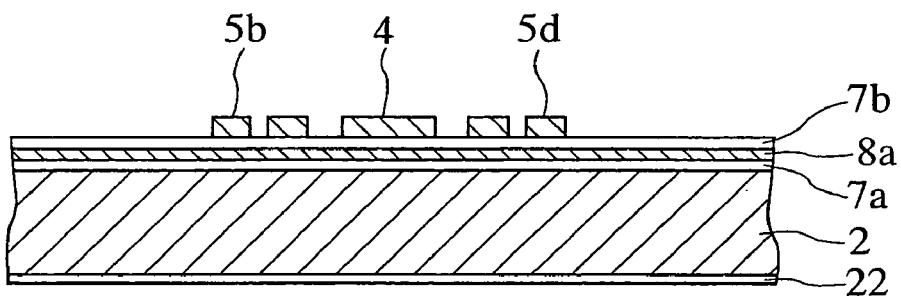

Then, as shown in FIG. 5(c), after forming a resist in a predetermined shape by known photolithography, the silicon (Si) semiconductor thin film 23 is patterned by a method, for example, of reactive dry etching to form a heat element 4, temperature measuring resistors 5a to 5d, a gas measuring temperature resistor 6 (not shown) and wiring connection portions 11 (11a to 11l) (not shown) for connecting each of the resistors and terminal electrodes 12.

Figure 5D:
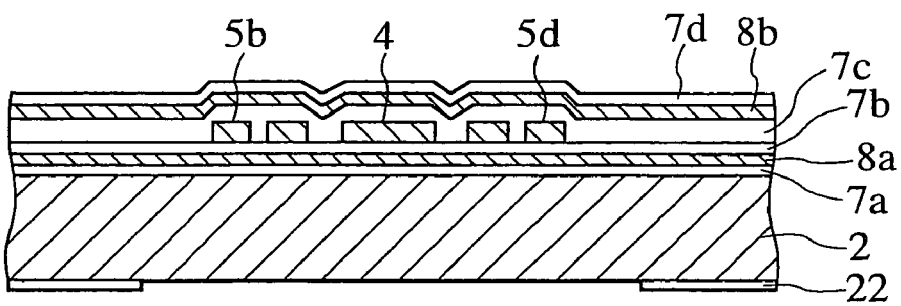

Then, as shown in FIG. 5D, in the same manner as in the steps of FIG. 5A, a silicon dioxide (SiO$_2$) layer is formed to about 0.5 μm in thickness as an insulating film 7c, a stoichiometrically stable silicon nitride (Si$_3$N$_4$) thin film is formed at a temperature of 770 to 800° C. by the LPCVD method to about 0.15 μm in thickness as the barrier layer 8b, and a silicon dioxide (SiO$_2$) layer is stacked to about 0.2 μm in thickness as an insulating film 7d.

After forming the insulating films 7c and 7d and the barrier layer 8b, a heat treatment is applied so as to enhance the stability of the resistance value (secular change) of the polycrystalline silicon (Si) semiconductor thin film. In a case where hydrogen is contained in a gas to be measured, the heat treatment annealing is applied in an atmosphere at least containing a hydrogen gas and in a case where hydrogen is not contained in the gas to be measured, a heat treatment annealing is applied in an inert gas atmosphere, at 550° C. or higher or 900° C. or lower.

As described above, the three-layered structure comprising the insulating films 7a and 7b and the barrier layer 8a are formed as the lower layer of the heat element 4, while the three-layered structure comprising the insulating films 7c and 7d and the barrier layer 8b are formed as the upper layer of the heat element 4. Since they provide a film structures symmetrical with respect to the upper and lower directions of the silicon (Si) semiconductor thin film 23, distortion of the diaphragm 3 by thermal stresses can be reduced to improve the strength.

Subsequently, although not illustrated, through holes are formed at predetermined positions of the insulating films 7c and 7d and the barrier layer 8b, the terminal electrodes 12 (12a to 12h) are formed, for example, with aluminum or gold to establish electric connection between the terminal electrodes and the resistors. Then, to form a cavity 9 in a silicon semiconductor substrate 2, a mask material 22 for etching is patterned in a predetermined shape to expose only the etched portion of the semiconductor substrate 2. For the mask material 22, silicon dioxide or silicon nitride of higher etching selectivity is used.

Figure 5E:
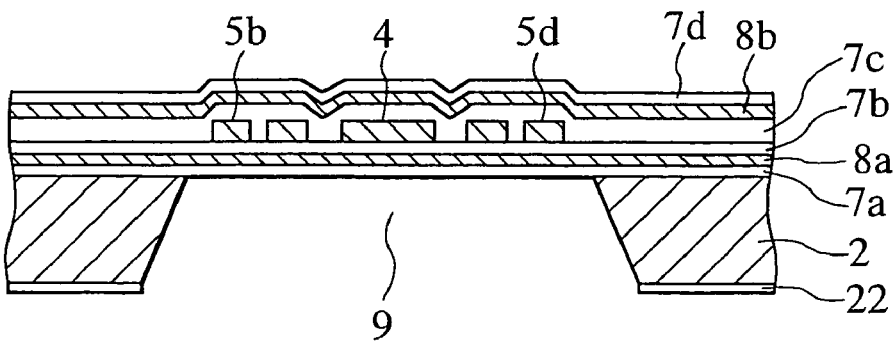

Then, as shown in FIG. 5(e), the cavity 9 is formed by applying anisotropic etching from the rear face of the silicon semiconductor substrate 2 by using silicon dioxide or silicon nitride as the mask material and using an etching solution, for example, of potassium hydroxide (KOH).

At the final step of the semiconductor production process or after forming aluminum or gold as the terminal electrodes 12, heat treatment annealing at a temperature of 400° C. or lower for 1 hour or more is applied in a hydrogen or an inert gas atmosphere to enhance the film quality of the electrode material such as aluminum or gold and to ensure electric connection. In the heat treatment annealing step at 400° C. or lower for 1 hour or more, when a gas to be measured is air, nitrogen, oxygen, gaseous carbon dioxide or steams, the heat treatment annealing is applied in a gas atmosphere, for example, of a measured gas or a nitrogen, argon, helium as an inert gas or fluorine. Further, when the measured gas is a gas containing hydrogen atoms such as hydrogen, city gas, methane, propane and butane, the heat treatment annealing is applied in the gas atmosphere of a measured gas or a hydrogen gas. By the heat treatment annealing, the stability of the resistance value (secular change) of the silicon (Si) semiconductor thin film can be improved further.

Further, since the heat element 4 and the temperature measuring resistors 5a to 5d, and 6 are doped at a high concentration of phosphorus (P) or boron (B) so that the resistivity (ρ) is 8×10$^{-4}$ Ωcm or less, the temperature coefficient of resistance (a) of the heat element 4 and the temperature measuring resistors 5a to 5d, and 6 can be kept relatively high. Therefore, a gas flowmeter that has a reduced cost and improved temperature measuring sensitivity can be provided.

Then, the resistivity and the temperature coefficient of resistance of the resistor used for the gas flowmeter as the first embodiment according to this invention will be explained with reference to FIGS. 6 and 7.

Figure 6:
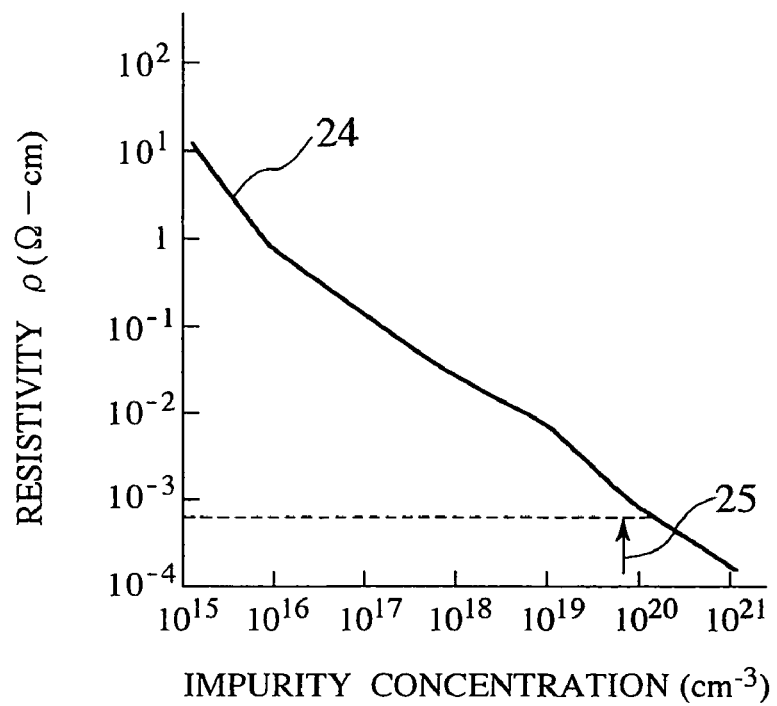
FIG. 6 is an explanatory view diagram showing a relation between resistivity ($\rho$) and impurity concentration of a silicon (Si) semiconductor thin film used in the gas flowmeter according to the first embodiment of this invention.

FIG. 6 is an explanatory diagram of a relation between resistivity (ρ) and impurity concentration of a silicon (Si) semiconductor thin film used in a gas flowmeter according to the first embodiment of this invention. FIG. 7 is an explanatory view for a relation between temperature coefficient of resistance (α) and resistivity (ρ) of a silicon (Si) semiconductor thin film used in a gas flowmeter according to the first embodiment of this invention.

A silicon (Si) semiconductor film generally shows resistance-temperature characteristics like a thermistor. However, it has a relatively narrow temperature range and when applied with an impurity doping treatment at high concentration, it shows resistance-temperature characteristics like a metal for example as shown in the following equation (1).

$$R = R0(1 + \alpha(T - T0)) \quad (1)$$

where R is a resistance value of a semiconductor film at a temperature (T), R0 is a resistance value of a semiconductor film at a temperature (T0), and α is a temperature coefficient of resistance.

Preferably, the temperature measuring resistors 5a to 5d and 6 have large temperature coefficient of resistance (α) in order to improve the detection sensitivity. Further, it is preferred that the heat element 4 has a small resistivity (ρ) in view of reducing a voltage for driving the heat element 4 when it is intended to be heated to a desired temperature (for example, 200° C.).

Figure 7:
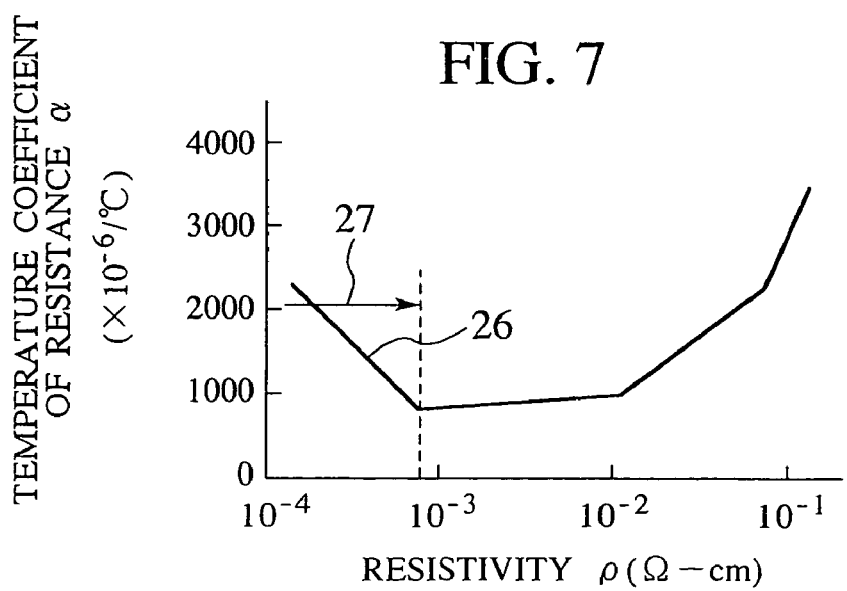
FIG. 7 is an explanatory diagram showing a relation between temperature coefficient of resistance ($\alpha$) and resistivity ($\rho$) of a silicon (Si) semiconductor thin film used in the gas flowmeter according to the first embodiment of this invention.

The solid line 26 in FIG. 7 shows a relation between the temperature coefficient of resistance (α) and the resistivity (ρ). In FIG. 7, the temperature coefficient of resistance (α) increases in a region 27 where the resistivity (ρ) is $8 \times 10^{-4}$ Ωcm or less. It is preferred that the temperature measuring resistors 5a to 5d and 6 have a large temperature coefficient of resistance (α) in view of the improvement in the detection sensitivity. Further, since it is preferred that the heat element 4 has a small resistivity (ρ), a large temperature coefficient of resistance (α)(1000 ($\times 10^{-6}$/° C.) or more) can be attained at a low resistivity (ρ) in a region 27 where the resistivity (P) is $8 \times 10^{-4}$ Ωcm or less.

In particular, for the heat element 4, increasing the thickness of the silicon (Si) semiconductor film is a possible measure to lower the resistance value. However, if the film thickness is increased, it is difficult to etch into a desired pattern at a good accuracy and this is not preferred also in view of the material cost. The limit for the thickness of the polycrystalline silicon (Si) semiconductor film capable of obtaining etching at high accuracy is about 1 μm, and the resistance value of the heat element 4 that can be driven by a driving voltage of 10 V or lower at this thickness is 1 kΩ or less. As has been described above, in a case where the resistivity (ρ) is $8 \times 10^{-4}$ Ωcm or less, if the heat element 4 measures 1 mm long by 0.1 mm wide by 1 μm thick, the resistance value of the heat element 4 is 80 Ω. Further, including as far as the resistance of the wiring connection portions 11 to be connected with the heat element 4, the entire resistance value is about 2000 Ω, which is less than 1 kΩ.

Then, in view of the relation between the resistivity (ρ) and the impurity concentration of the silicon (Si) semiconductor thin film shown by the solid line 24 in FIG. 6, the impurity concentration when the resistivity (ρ) is $8 \times 10^{-4}$ Ωcm or less is in a region of $2 \times 10^{20}$ (cm$^{-3}$) or more shown by a region 25 in FIG. 6. The resistance value of the heat element is selected from 50 to 900 Ω, while the resistance values of the temperature measuring resistors 5a to 5d and 6 are selected from 1 to 10 kΩ in view of power source voltage and the amount of heat generation in this embodiment.

Then, the barrier layer used for the sensor device of the gas flowmeter according to the first embodiment of this invention will be described with reference to FIGS. 8 to 10.

Figure 8:
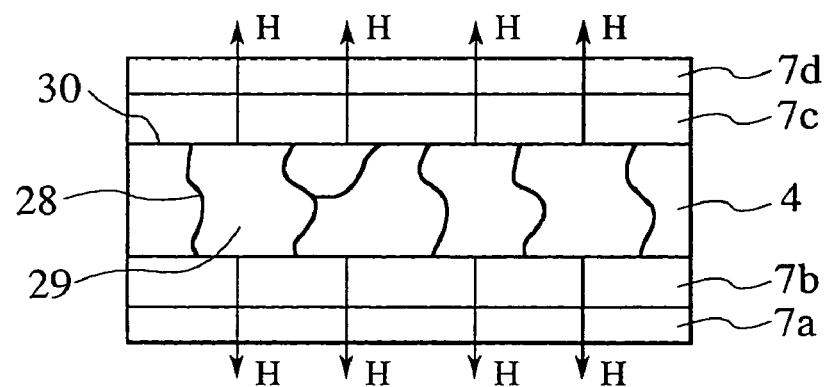
FIG. 8 is an explanatory view of a barrier layer used in the sensor device of the gas flowmeter according to the first embodiment according of this invention.
Figure 9A:
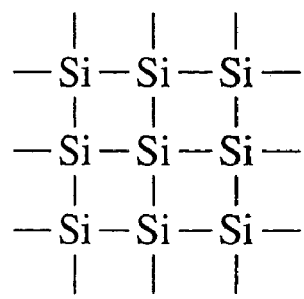
FIG. 9 is an explanatory diagram of a barrier layer used in the sensor device of the gas flowmeter according to the first embodiment of this invention.
Figure 9B:
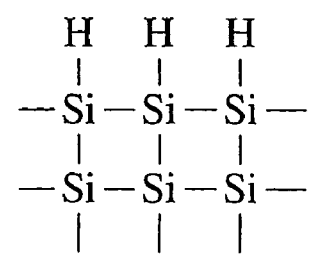
Figure 9B:
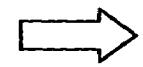
Figure 9C:
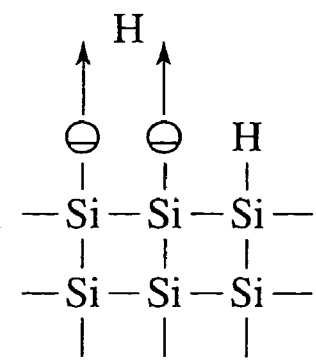
Figure 10:
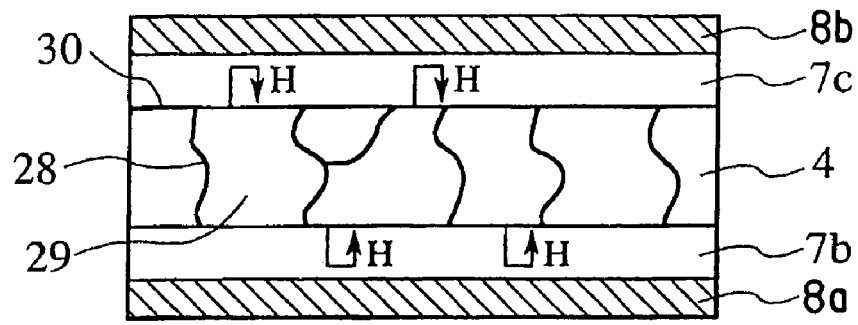
FIG. 10 is an explanatory view of a barrier layer used in the sensor device of the gas flowmeter according to the first embodiment of this invention.

FIGS. 8 to 10 are explanatory views of a barrier layer used in the sensor device of the gas flowmeter according to the first embodiment of this invention. Identical reference numerals with those in FIG. 1 show identical portions.

FIG. 8 shows is an enlarged view for a portion B in FIG. 2 which lacks the barrier layers 8a and 8b shown in FIG. 1. The insulating films 7a, 7b, 7c and 7d comprising silicon dioxide (SiO$_2$) are formed above and below the heat element 4 comprising the polycrystalline silicon (Si) semiconductor film. Crystal grains 29 of silicon (Si), grain boundaries 28, and boundary faces 30 with silicon dioxide (SiO$_2$) are present in the polycrystalline silicon (Si) semiconductor film 4.

As shown in FIG. 9A, in the crystal grains 29 of silicon (Si) shown in FIG. 8, silicon (Si) atoms are regularly arranged and bonded in a single crystalline state to form a chemically stable ideal structure. On the other hand, as shown in FIG. 9B, regular arrangement and bonding of the silicon (Si) atoms are intervened into an instable state in the grain boundaries 28, at the boundary faces with silicon oxide (SiO$_2$) and in the defects (not illustrated) in the crystal grains 29. In particular, in the LPCVD method of forming a polycrystalline silicon (Si) semiconductor film or a silicon dioxide (SiO$_2$) film, hydrogen gas components are generated during the production process, bonding between silicon (Si) and hydrogen (H) caused by the intervention of regular arrangement is formed (dangling bond) as shown in FIG. 9B in the grain boundaries 28, the defect regions or at the boundary faces 30 of the polycrystalline silicon (Si) semiconductor thin film. Since the Si—H bond (dangling bond) energy is 3.1 eV, which is lower compared with Si—N or Si—F bonding in other gases and dangling bonds are formed and dissociated easily, for example, by the elevation of temperature. In a state where Si—H dangling bonds are formed as shown in FIG. 9B, since the energy barrier in the grain boundary or the defect regions in the polycrystalline silicon (Si) semiconductor thin film is lowered, the resistance value is decreased.

However, in the structure with no barrier layers 8a and 8b shown in FIG. 8, when the heat element is heated and a flow rate is measured for a long period of time, the Si—H dangling bonds are easily dissociated as shown in FIG. 9C, and hydrogen diffuses and dissociates in the silicon dioxide (SiO$_2$) film, so that the energy barrier in the grain boundaries or defect regions of the polycrystalline silicon (Si) semiconductor thin film is increased to thereby increase the resistance value, which causes a secular change.

On the other hand, FIG. 10 shows a constitution of forming the barrier layers 8a and 8b in this embodiment. Since the barrier layers 8a and 8b stop diffusion and dissociation of hydrogen, the Si—H dangling bonds are stabilized and the aging change of the resistance is decreased also in a case of measuring the flow rate for a long period of time by heating the heat element.

Figure 11:
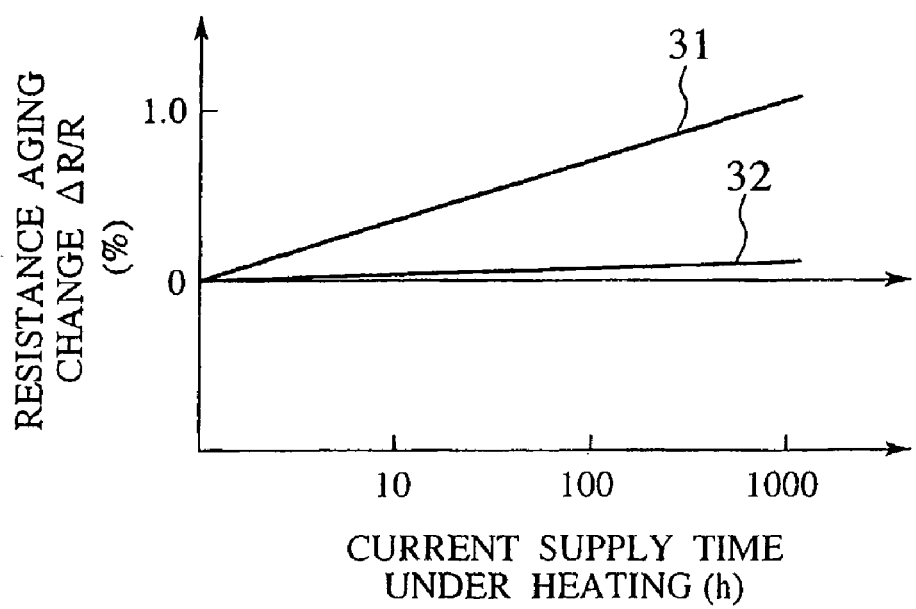
FIG. 11 is an explanatory diagram of a barrier layer used in the sensor device of the gas flowmeter according to the first embodiment of this invention.

A description will then be made of the secular change depending on the presence or absence of the barrier layer used in the sensor device of the gas flowmeter according to the first embodiment of this invention with reference to FIG. 11.

FIG. 11 is an explanatory view of a barrier layer used in the sensor device of the gas flowmeter according to the first embodiment of this invention.

FIG. 11 shows the result of the experiment for the secular change of the resistance of the heat element 4 in a case where the barrier layers 8a and 8b are formed above and below the heat element 4 comprising the polycrystalline silicon (Si) semiconductor film (solid line 32) and in a case of the constitution with no barrier layers (solid line 31). In FIG. 11, the abscissa denotes a current supply time while the ordinate shows the change of resistance after current supply. In this experiment, the heat element 4 is heated to 250° C. under current supply.

As shown by the solid line 31, the secular change of the resistance after 1000 hours of the current supply time for heating is about 1% in the constitution with no barrier layers. On the contrary, as shown by the solid line 32, it can be seen that the secular change of the heat element 4 can be improved greatly by forming the barrier layers 8a and 8b above and below the heat element 4 comprising the polycrystalline silicon (Si) semiconductor film.

Although not illustrated, when only one barrier layer 8a is formed, the result was substantially equal with the result of lacking the barrier layer. It is effective in the suppression of the secular change of the heat element 4 to form the barrier layers 8a and 8b for both the layers above and below the heat element 4 comprising the polycrystalline silicon (Si) semiconductor film, thereby surrounding the heat element 4 with the barrier layers.

Further, a description will be made of a further method of preventing the secular change in the sensor device of the gas flowmeter according to the first embodiment of this invention with reference to FIGS. 12 and 13.

Figure 12:
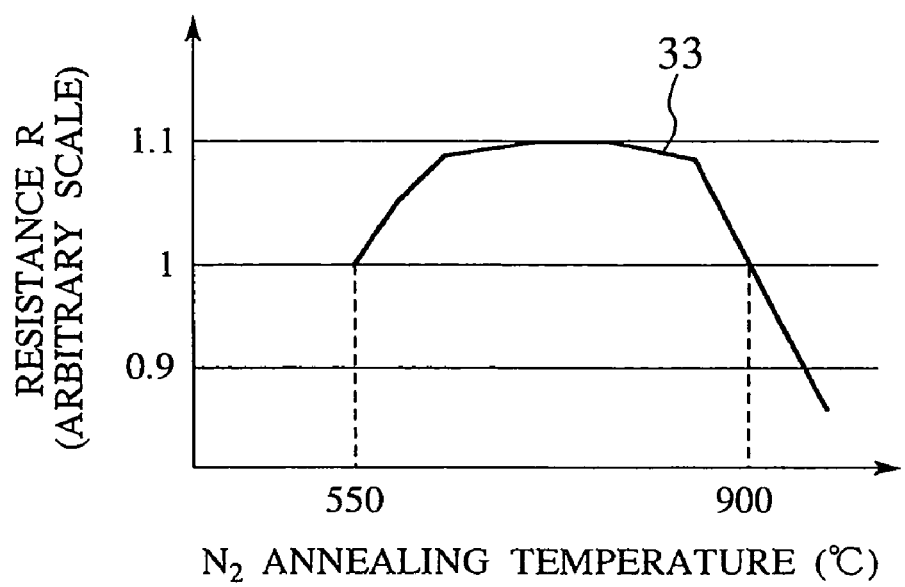
FIG. 12 is an explanatory diagram showing further method of preventing secular change in the sensor device of the gas flowmeter according to the first embodiment of this invention.
Figure 13:
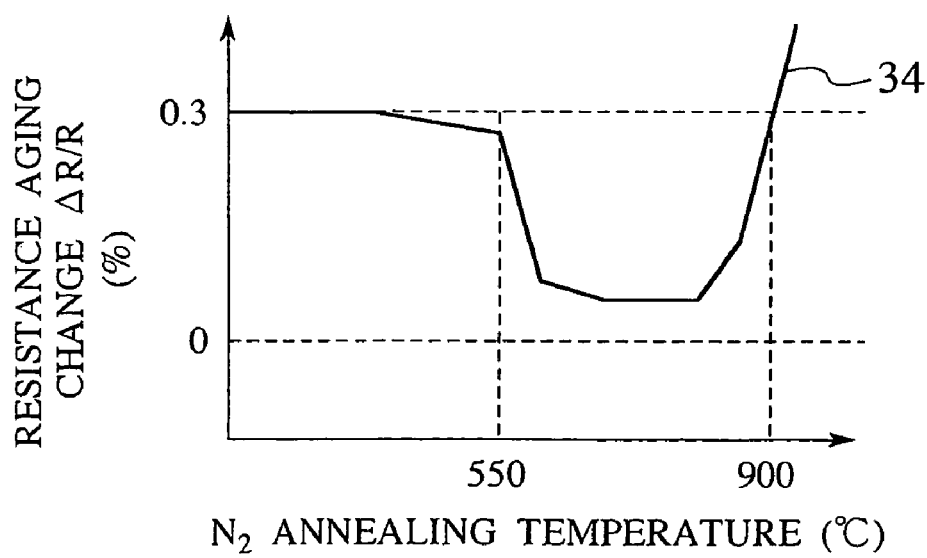
FIG. 13 is an explanatory diagram showing further method of preventing secular change in the sensor device of the gas flowmeter according to the first embodiment of this invention.

FIGS. 12 and 13 are explanatory views of further methods of preventing secular change of the sensor device of the gas flowmeter according to the first embodiment of this invention.

In the method of preventing the secular change, after forming the barrier layers 8a and 8b, a heat treatment annealing is applied in an atmosphere at least containing a hydrogen gas in a case where hydrogen is contained in the gas to be measured and a heat treatment annealing is applied in an inert gas atmosphere in a case where hydrogen is not contained in the gas to be measured, within a temperature range from 500° C. to 900° C., respectively.

FIGS. 12 and 13 show the effects of the heat treatment annealing of the resistance and the secular change of the resistance of the heat element 4, respectively, in the inert gas (nitrogen, argon, helium, fluorine, etc.) atmosphere, the heat element 4 comprising the polycrystalline silicon (Si) semiconductor film formed with the barrier layers 8a and 8b in a case where hydrogen is not contained gas to be measured.

The stoichiometrically stable silicon nitride ($Si_3N_4$) thin film of the barrier layers 8a and 8b has a characteristic of less permeating and absorbing hydrogen at 550° C. or lower but easily permeating hydrogen at a temperature of 550° C. or higher. In view of the above, in a case where hydrogen is not contained in the gas to be measured, when hydrogen that forms excessive Si—H dangling bonds in the polycrystalline silicon (Si) semiconductor film surrounded with the barrier layers 8a and 8b is driven to the outside by heat treatment annealing previously at 550° C. or higher, the secular change of the resistor can be further decreased in a heat generating temperature range of the heat element 4 (<550° C.) in the subsequent stage.

Since hydrogen that forms excessive Si—H dangling bonds are eliminated by the heat treatment annealing at 550° C. or higher, the resistance value 33 shown in FIG. 12 is somewhat increased by the increase of the energy barrier, but the resistance secular change 34 shown in FIG. 13 is improved remarkably.

On the other hand, at the heat treatment annealing temperature of 900° C. or higher, phosphorus (P) impurity-doped at high concentration into the polycrystalline silicon (Si) semiconductor film is activated and phosphorus (P) starts to diffuse from the grain boundaries and boundaries where phosphorus is precipitated in a great amount into crystal grains and the decrease of phosphorus (P) at the grain boundaries and the boundaries results in the increase of Si—H dangling bonds, so that the aging change of resistance rather increases. In view of the above, a temperature range from 550° C. to 900° C. is optimal for the heat treatment annealing.

The foregoing has described the case in which hydrogen is not contained in the gas to be measured. When hydrogen is contained in the gas to be measured, hydrogen in the gas to be measured is rather taken into the polycrystalline silicon (Si) semiconductor film with lapse of time to increase the Si—H dangling bonds showing a secular change where the resistance value of the heat element 4 decreases. Accordingly, in a case where hydrogen is contained in the gas to be measured, it is necessary to previously take in a sufficient amount of hydrogen that forms Si—H dangling bonds in the polycrystalline silicon (Si) semiconductor film surrounded by the barrier layers 8a and 8b. For this purpose, the heat treatment annealing is applied in a temperature range from 550° C. to 900° C. in a hydrogen gas-containing atmosphere to take in hydrogen from the outside (heat treatment atmosphere) by way of the barrier layers 8a and 8b, by which a heat element 4 with less secular change of resistance can be attained also even in a case where hydrogen is contained in the gas to be measured.

While the foregoing has described the heat element 4, similar effects can be also obtained by applying the foregoing to the silicon (Si) semiconductor films such as for the temperature measuring resistors 5a to 5d, the gas temperature measuring resistor 6 and wiring connection portions 11 (11a to 11l) for connecting each of the resistors and terminal electrodes 12.

Further, by applying a doping treatment of impurities such as phosphorus (P) at high concentration such that the resistivity ($\rho$) of the silicon (Si) semiconductor thin film is $8 \times 10^{-4}$ Ωcm or less, the resistance value and the temperature coefficient of resistance optimal for each of the resistors can be obtained and, since phosphorus (P) precipitated in a great amount at the grain boundaries, defects and the boundary faces of the silicon (Si) semiconductor film inhibit the formation of Si—H dangling bonds, the secular change of the resistance for each of the resistors can be reduced.

Further, while the description has been made of an example in which a stoichiometrically stable silicon nitride ($Si_3N_4$) thin film is applied as the barrier layers 8a and 8b, similar effect can be also obtained by applying barrier film materials having a characteristic of less permeating and absorbing hydrogen in the heat generating temperature range of the heat element 4, for example, gold (Au) or silver (Ag).

In this case, the use of a hydrogen absorptive and storing type metal such as a titanium (Ti, Ti alloy) system or nickel (Ni, Ni alloy) system is not appropriate as the material for the barrier layers 8a and 8b. In the hydrogen absorptive and storing type barrier layer, hydrogen once stored in the barrier layer repeats precipitation and storage with lapse of time of heat generation of the heat element 4. Accordingly, formation of the Si—H dangling bonds in the silicon (Si) semiconductor film fluctuates with time and the resistance value of the heat element 4 is unstable and is not maintained constant.

Further, silicon dioxide ($SiO_2$) is not suitable as the material for the barrier layers 8a and 8b since this can easily permeate hydrogen in the heat generating temperature range of the heat element 4, and the silicon (Si) semiconductor film is neither suitable to the barrier layer material since this is a hydrogen absorptive and storing type material.

The gas to be measured not containing hydrogen can include, for example, air, nitrogen, oxygen, gaseous carbon dioxide and steams, while the gas to be measured containing hydrogen includes hydrogen, city gas, methane, propane or butane as the target.

In the foregoing, silicon (Si) semiconductor film has described as the polycrystalline. However, also in the single crystalline silicon (Si) semiconductor film, regular arrangement/bonding of silicon. (Si) atoms are intervened into an instable state, as shown in FIG. 9B, at the boundary faces 30 with the silicon dioxide ($SiO_2$) and in the defects in the crystal grains 29 (not shown) as shown in FIG. 8, and bonding of silicon (Si) and hydrogen (H) (dangling bonds) in which regular arrangement/bonding are intervened are formed. Accordingly, this embodiment also has a similar effect on the single crystalline silicon (Si) semiconductor film.

As has been described above, according to this embodiment, since barrier layers which less permeate and absorb hydrogen are formed above and below the heat element as the silicon (Si) semiconductor thin film impurity-doped at a high concentration respectively so as to surround the heat element, the secular change upon measurement of the gas flow rate can be decreased and the gas flow rate can be measured at high reliability.

Further, the heat treatment annealing is applied at a temperature of 550° C. or higher and 900° C. or lower in an atmosphere containing at least a hydrogen gas after forming the upper barrier layer described above in a case where hydrogen is contained in the gas to be measured, and in an inert gas atmosphere after forming the barrier layer in a case where hydrogen is not contained in the gas to be measured, by which the secular change upon measurement of the gas flow rate can be decreased and, accordingly, the gas flow rate can be measured at high reliability.

The constitution of a gas flowmeter according to a second embodiment of this invention will then be described with reference to FIG. 4. The planar constitution of a sensor device of the gas flowmeter in this embodiment is identical with that shown in FIG. 1.

Figure 14:
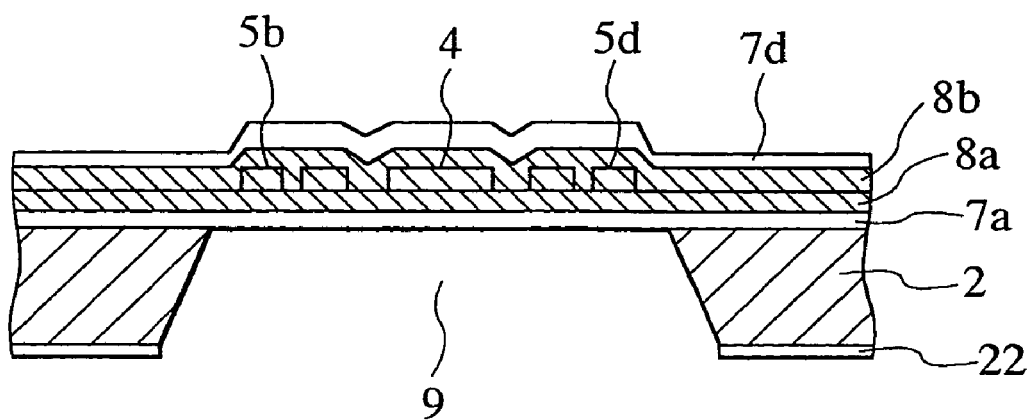
FIG. 14 is a cross sectional view showing the constitution of a gas flowmeter according to a second embodiment of this invention.

FIG. 14 is a cross sectional view showing the constitution of the gas flowmeter according to the second embodiment of this invention. Identical reference numerals with those in FIG. 1 show identical portions.

The principal constitution of the gas flowmeter in this embodiment is identical with that shown in FIGS. 1 to 2, but the feature resides in saving the insulating films 7b and 7c interposed between the barrier layers 8a and 8b in the first embodiment shown in FIG. 2.

With such a structure described above, since each of the resistors 4, 5b and 5d of the silicon (Si) semiconductor thin film are surrounded more reliably by the barrier layers 8a and 8b, the secular change upon measurement of the gas flow rate can be decreased.

According to this embodiment, since barrier layers which less permeate and absorb hydrogen are formed above and below the heat element as the silicon (Si) semiconductor thin film impurity-doped at a high concentration respectively so as to surround the heat element, the secular change upon measurement of the gas flow rate can be decreased and the gas flow rate can be measured at high reliability.

The constitution of a gas flowmeter according to a third embodiment of to this invention will then be described with reference to FIG. 15. The planar constitution of the sensor device of the gas flowmeter in this embodiment is identical with that shown in FIG. 1.

Figure 15:
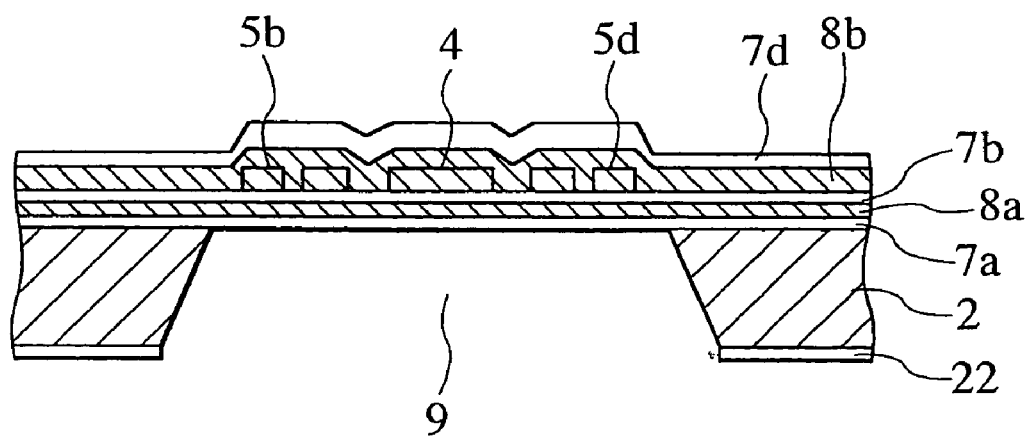
FIG. 15 is a cross sectional view showing the constitution of a gas flowmeter according to a third embodiment of this invention.

FIG. 15 is a cross sectional view showing a constitution of a gas flowmeter according to the third embodiment of this invention. Identical reference numerals with those in FIG. 1 show identical portions.

The principal constitution of the gas flowmeter in this embodiment is identical with that shown in FIG. 14 and it further has a feature in saving the insulating film 7c provided in the second embodiment shown in FIG. 14. It is also possible to save the insulating film 7b.

According to this embodiment, since barrier layers which less permeate and absorb hydrogen in the heat generating temperature range of the heat element are disposed respectively above and below the heat element of the silicon (Si) semiconductor thin film impurity doped at high concentration so as to surround the heat element, so that the secular change upon measurement of the gas flow rate can be reduced and, accordingly, the gas flow rate can be measured at high reliability is possible.

According to this invention, the secular change of the gas flowmeter can be reduced.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A gas flow meter for measuring a flow rate of a gas to be measured comprising:
    a semiconductor substrate formed with a cavity; and
    at least a heat element formed in an insulating film above the cavity of the semiconductor substrate; wherein,
    the heat element comprises a silicon (Si) semiconductor thin film applied with impurity doping at high concentration; and
    the gas flow meter has barrier layers that are disposed as an upper layer and a lower layer of the silicon (Si) semiconductor thin film and that are formed in a region to cover at least the cavity, the barrier layers being less permeable and absorbent to hydrogen in a heat generating temperature range of the heat element and the barrier layers inhibiting diffusion and association of hydrogen from said silicon semiconductor thin film which forms said heating elements.

2. A gas flow meter as defined in claim 1, wherein the barrier layer comprises a stoichiometrically stable silicon nitride ($Si_3N_4$) thin film.

3. A gas flow meter as defined in claim 1, wherein the silicon (Si) semiconductor thin film is a polycrystalline silicon (Si) semiconductor thin film applied with impurity-doping, and
    the polycrystalline silicon (Si) semiconductor thin film is doped with phosphorus (P) or boron (B) as impurities at a high concentration.

4. A gas flow meter as defined in claim 1, wherein the doping is applied at such high concentration that resistivity of the silicon (Si) semiconductor thin film is $8 \times 10^{-4}$ Ωcm or less.

5. A flow meter for measuring a flow rate of a gas to be measured comprising:
    a semiconductor substrate formed with a cavity; and
    at least a heat element comprising a silicon semiconductor thin film formed in an insulating film above the cavity of the semiconductor substrate; wherein,
    the silicon (Si) semiconductor thin film is a polycrystalline applied with impurity doping of phosphorus (P) or boron (B) as impurities at high concentration; and
    the gas flow meter has barrier layers that are disposed as an upper layer and a lower layer of the silicon (Si) semiconductor thin film, and are formed in a region to cover at least the cavity, the barrier layers being less permeable and absorbent to hydrogen in a heat generating temperature range and the barrier layers inhibiting diffusion and association of hydrogen from said silicon semiconductor thin film which forms said heating elements.

6. A gas flow meter as defined in claim 5, wherein the doping is applied at such high concentration that resistivity of the silicon (Si) semiconductor thin film is $8 \times 10^{-4}$ Ωcm or less.

7. Apparatus for measuring a gas flow rate, comprising:
   a semiconductor substrate formed with an opening therein; and
   at least one heating element formed in a multilayer film structure which covers said opening, said heating element comprising a silicon semiconductor thin film with impurity doping at a high concentration;
   wherein, said multilayer film structure includes upper and lower film means, formed on opposite sides of said heating element, for inhibiting diffusion and dissociation of hydrogen from said silicon semiconductor thin film which forms said heating elements.

* * * * *